(12) United States Patent
Glovak

(10) Patent No.: US 9,168,872 B1
(45) Date of Patent: Oct. 27, 2015

(54) STEP ASSEMBLY FOR A MOTOR VEHICLE HAVING A BED

(71) Applicant: GM Global Technology Operations LLC, Detroit, MI (US)

(72) Inventor: Dan W. Glovak, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/264,486

(22) Filed: Apr. 29, 2014

(51) Int. Cl.
 *B60R 3/02* (2006.01)
 *B60R 3/00* (2006.01)
(52) U.S. Cl.
 CPC ..................... *B60R 3/002* (2013.01)
(58) Field of Classification Search
 CPC ................. B60R 3/002; B60R 3/02
 USPC ....................... 280/166, 164.1, 163
 See application file for complete search history.

(56) References Cited

U.S. PATENT DOCUMENTS

| | | | | | |
|---|---|---|---|---|---|
| 4,116,457 | A | * | 9/1978 | Nerem et al. | 280/166 |
| 4,180,143 | A | * | 12/1979 | Clugston | 182/91 |
| 5,358,268 | A | * | 10/1994 | Hawkins | 280/166 |
| 5,375,864 | A | * | 12/1994 | McDaniel | 280/166 |
| 6,003,633 | A | * | 12/1999 | Rolson | 182/127 |
| 6,435,534 | B1 | * | 8/2002 | Stone | 280/163 |
| 7,513,565 | B2 | * | 4/2009 | Watson | 296/199 |
| 2008/0116653 | A1 | * | 5/2008 | Piotrowski | 280/166 |
| 2008/0252034 | A1 | * | 10/2008 | Duncan | 280/163 |
| 2010/0102528 | A1 | * | 4/2010 | Stickles et al. | 280/163 |
| 2010/0194070 | A1 | * | 8/2010 | Stauffer et al. | 280/166 |
| 2012/0098231 | A1 | * | 4/2012 | Huotari et al. | 280/166 |

* cited by examiner

*Primary Examiner* — Jeffrey J Restifo
(74) *Attorney, Agent, or Firm* — Cantor Colburn LLP

(57) ABSTRACT

A step assembly for a motor vehicle having a passenger compartment including a driver side and a passenger side and a cargo bed having first and second side portions includes a step member extending from a first end configured to be mounted at one of the driver side and the passenger side of the passenger compartment to a second end configured to be mounted at a corresponding one of the first and second side portions of the cargo bed.

16 Claims, 5 Drawing Sheets

US 9,168,872 B1

STEP ASSEMBLY FOR A MOTOR VEHICLE HAVING A BED

FIELD OF THE INVENTION

The subject invention relates to the art of motor vehicles and, more particularly to a step assembly for a motor vehicle having a bed.

BACKGROUND

Motor vehicles, such as pick-up trucks, include a cargo bed and a passenger compartment. In most cases, the cargo bed is decoupled or isolated from the passenger compartment to enhance rideability and passenger comfort. Many pick-up trucks have a ground clearance that is greater than that of standard passenger vehicles. Accordingly, stepping into and out from the passenger compartment may be challenging. Also, accessing the cargo bed may prove challenging to certain individuals. Manufacturers have provided steps on either side of the passenger compartment to aid riders stepping into and alighting from the motor vehicle. Manufacturers have also provided tail gate steps that aid in stepping into and down from the cargo bed. Often times, it is desirable to access a side portion of a cargo bed. Accordingly, it is desirable to provide an assist step assembly for a motor vehicle having a bed that provides access to side portions of the cargo bed.

SUMMARY OF THE INVENTION

In accordance with one exemplary embodiment, a step assembly for a motor vehicle having a passenger compartment includes a driver side and a passenger side and a cargo bed having first and second side portions including a step member extending from a first end configured to be mounted at one of the driver side and the passenger side of the passenger compartment to a second end configured to be mounted at a corresponding one of the first and second side portions of the cargo bed.

In accordance with another exemplary embodiment, a motor vehicle includes a passenger compartment including a driver side and a passenger side. A cargo bed is mechanically isolated from the passenger compartment. The cargo bed includes a forward portion, a rear portion, and first and second side portions. A step assembly extends from the passenger compartment to the cargo bed. The step assembly includes a step member extending from a first end mounted at one of the driver side and the passenger side of the passenger compartment to a second end mounted at a corresponding one of the first and second side portions of the cargo bed.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
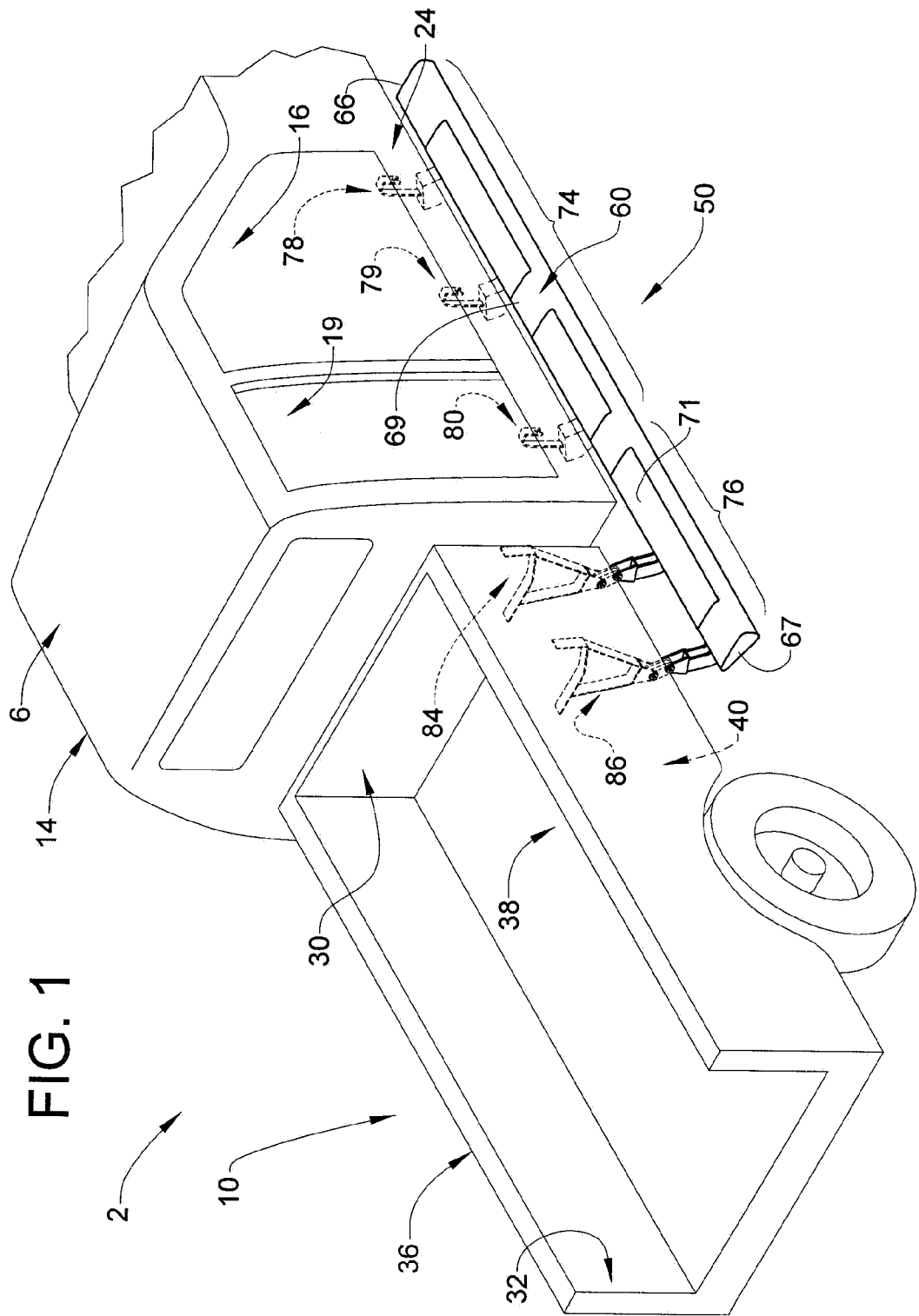
FIG. 1 is a perspective view of a motor vehicle having a cargo bed including a step assembly, in accordance with an exemplary embodiment.

The following description is merely exemplary in nature and is not intended to limit the present disclosure, its application or uses. It should be understood that throughout the drawings, corresponding reference numerals indicate like or corresponding parts and features.

With initial reference to FIG. 1, a motor vehicle, in accordance with an exemplary embodiment, is indicated generally at 2. Motor vehicle 2 includes a passenger compartment 6 and a cargo bed 10. Cargo bed 10 is mechanically isolated from passenger compartment 6. The term "mechanically isolated" should be understood to describe that movement/vibrations of cargo bed 10 do not translate to corresponding movement/vibrations in passenger compartment 6. Passenger compartment 6 includes a driver side 14 and a passenger side 16. Passenger compartment 6 may also include an additional rear seating/storage area 19. Passenger side 16 may include a cab body portion 24. Driver side 14 may include a corresponding frame member (not shown). Cargo bed 10 includes a forward portion 30, a rear portion 32 having a tailgate (not shown), a first or driver side portion 36 and a second or passenger side portion 38. Cargo bed 10 also includes an underside 40.

In accordance with an exemplary embodiment, motor vehicle 2 includes a step assembly 50 which, as will be detailed more fully below, extends along passenger compartment 6 and cargo bed 10. Step assembly 50 includes a step member 60 that extends from a first end 66 to a second end 67 through an intermediate portion 69 having a tread or step surface 71. Step member 60 includes a passenger compartment portion 74 that extends along passenger compartment 6 and a cargo bed portion 76 that extends along a portion of cargo bed 10.

In the exemplary embodiment shown, step assembly 50 includes a first fixed mounting bracket assembly 78, a second fixed mounting bracket assembly 79 and a third fixed mounting bracket assembly 80 that join passenger compartment portion 74 and passenger compartment 6 along passenger side 16. First, second, and third fixed mounting bracket assemblies 78-80 may join step member 60 to passenger compartment 6 through cab body 24. First, second, and third fixed mounting bracket assemblies 78-80 may also limit relative movement of step member 60 and passenger compartment 6. Step assembly 50 also includes a first flexible mounting bracket assembly 84 and a second flexible mounting bracket assembly 86. First and second flexible mounting bracket assemblies 84 and 86 provide a resilient interface between cargo bed portion 76 of step member 60 and cargo bed 10. Specifically, first and second flexible mounting bracket assemblies 84 and 86 allow for relative movement of cargo bed 10 and step member 60.

Figure 2:
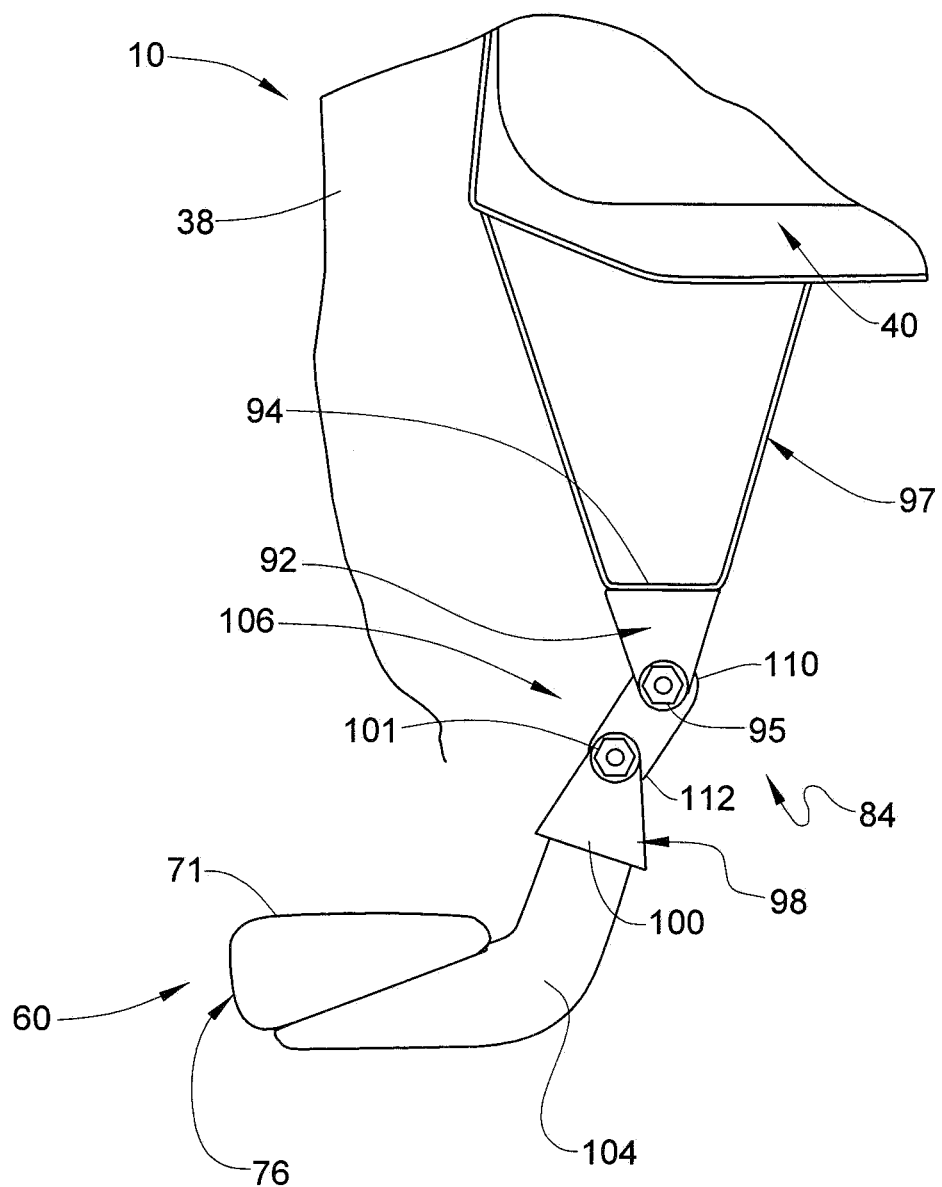
FIG. 2 is a plan view of a flexible bracket assembly of the step assembly of FIG. 1.

Reference will now follow to FIG. 2 in describing first flexible mounting bracket assembly 84 with an understanding that second flexible mounting bracket assembly 86 may include similar structure. First flexible mounting bracket assembly 84 includes a first member 92 extending from a base portion 94 to a cantilevered portion 95 having an opening 96

Figure 3:
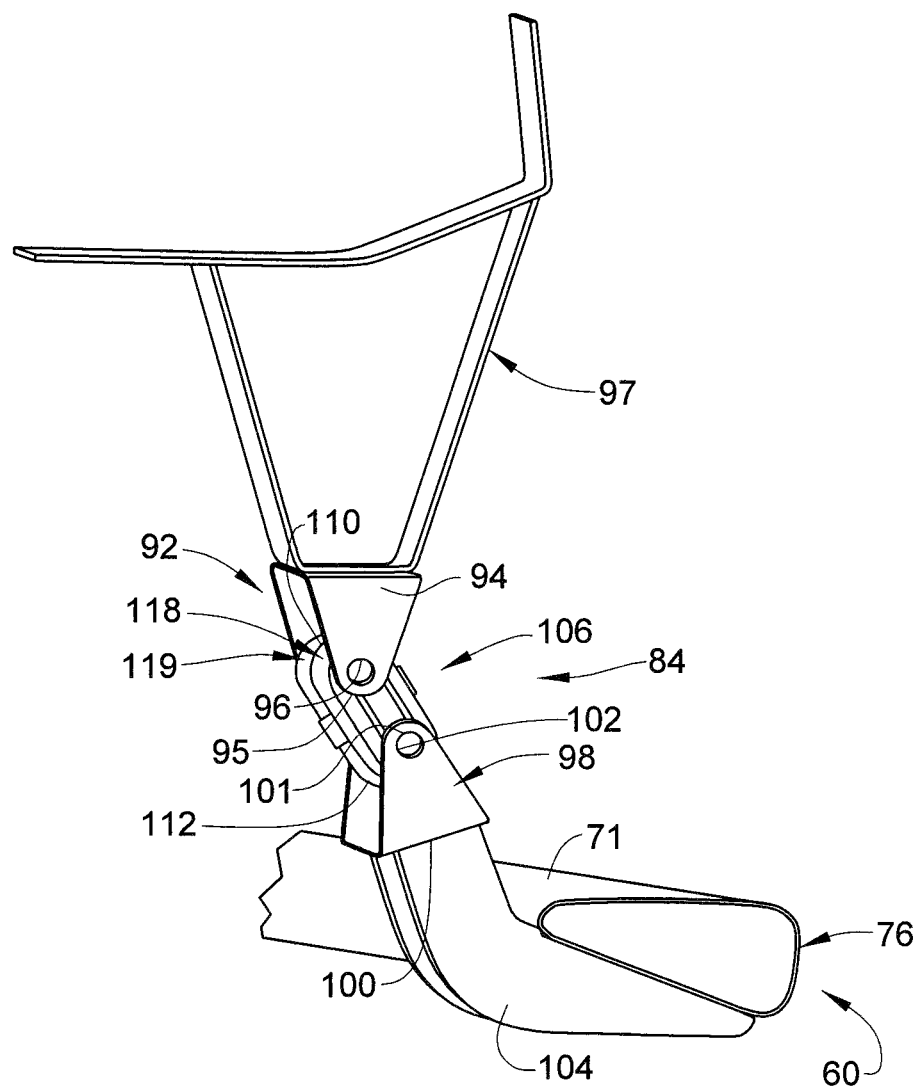
FIG. 3 is a partially cut-away perspective view of a step assembly of FIG. 2, in accordance with an aspect of an exemplary embodiment

(FIG. 3). Base portion 94 may be secured to underside 40 of cargo bed 10 through a bracket 97. Bracket 97 may also be secured to a frame member (not shown) coupled to cargo bed 10. First flexible mounting bracket assembly 84 also includes a second member 98 that extends from a base section 100 to a cantilevered section 101 having an opening 102 (FIG. 3). Base section 100 is joined to cargo bed portion 76 of step member 60 through a member 104. Cantilevered portion 95 of first member 92 is joined to cantilevered section 101 of second member 98 through a flexible member 106.

In accordance with an aspect of an exemplary embodiment, flexible member 106 may extend from a first end section 110 having a first opening (not separately labeled) to a second end section 112 having a second opening (also not separately labeled). The first opening aligns with opening 96 in cantilevered portion 95 while the second opening aligns with opening 102 in cantilevered section 101. A first mechanical fastener (not separately labeled) links first end section 110 to cantilevered portion 95. A second mechanical fastener (also not separately labeled) links second end section 112 to cantilevered section 101. In this manner, flexible member 106 provides a resilient interface between step member 60 and cargo bed 10. At this point it should be understood that flexible member 106 may be formed from a first flexible member section 118 and a second flexible member section 119. First and second flexible member sections 118 and 119 are aligned with one another to form a multi-component flexible member.

Figure 4:
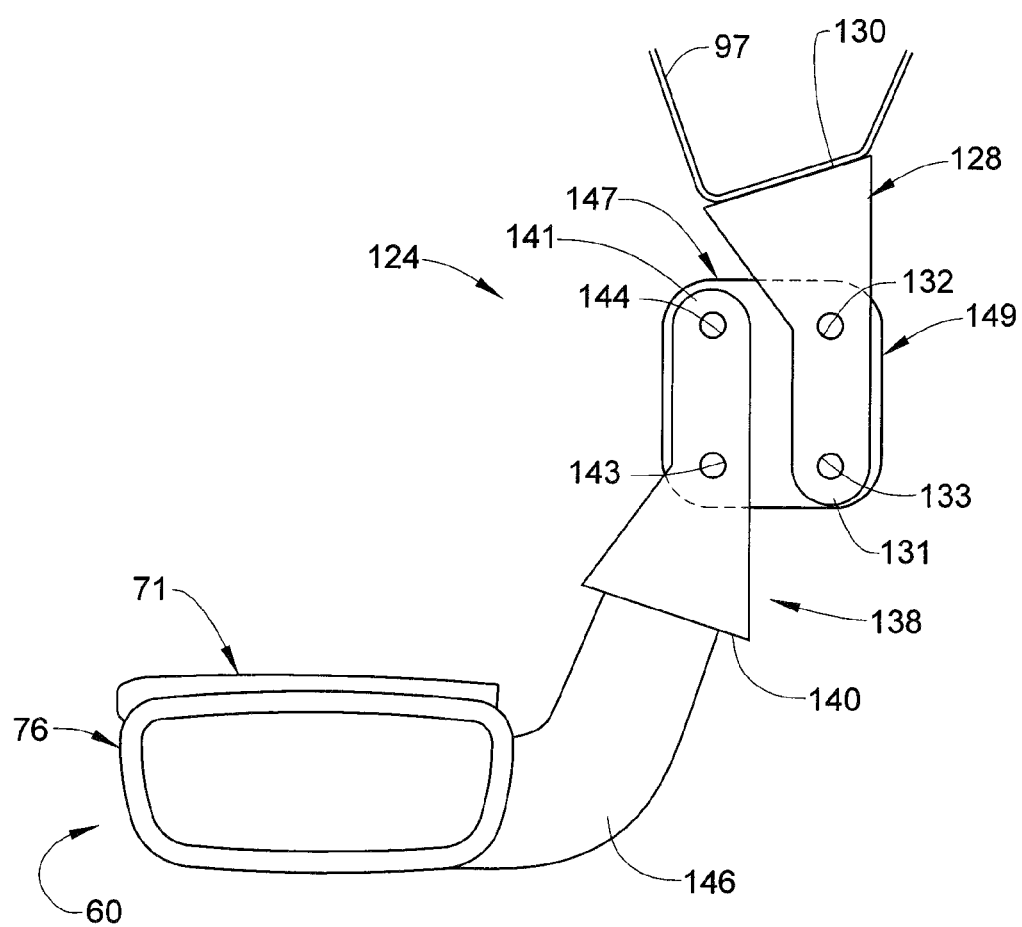
FIG. 4 is a plan view of a flexible bracket assembly, in accordance with another aspect of an exemplary embodiment.

Reference will now be made to FIG. 4 in describing a flexible bracket assembly 124, in accordance with another aspect of an exemplary embodiment. Flexible bracket assembly 124 includes a first member 128 extending from a base portion 130 to a cantilevered portion 131 having a first opening 132 and a second opening 133. Base portion 130 may be joined to underside 40 of cargo bed 10 through bracket 97. Flexible bracket assembly 124 also includes a second member 138 extending from a base section 140 to a cantilevered section 141 having a first opening 143 and a second opening 144. Base section 141 may be joined to step member 60 through a member 146.

Figure 5:
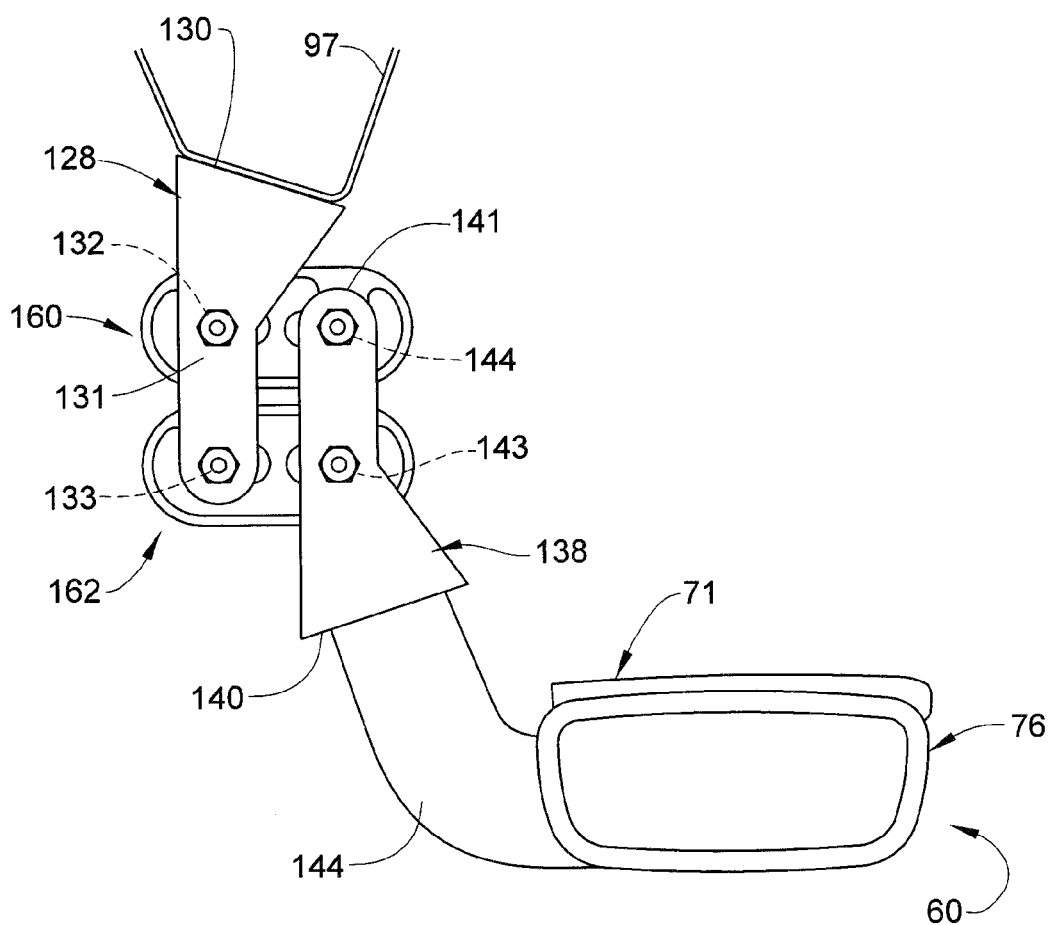
FIG. 5 is a plan view of a flexible bracket assembly, in accordance with yet another aspect of an exemplary embodiment.

In the exemplary embodiment shown, cantilevered portion 131 of first member 128 is joined to cantilevered section 141 of second member 138 by a flexible member 147. Flexible member 147 includes a body 149 having a plurality of openings (not separately labeled). Two of the plurality of openings align with first and second openings 132 and 133 on first member 128 and another two of the plurality of openings align with first and second openings 143 and 144 on second member 138. Mechanical fasteners (not shown) may join first and second members 128 and 138 with flexible member 147. In the exemplary embodiment shown, flexible member 147 may be formed as a single body having multiple openings that join first and second members 128 and 138 to provide a resilient interface between step member 60 and cargo bed 10. Of course it should be understood that first member 128 may be joined to second member 138 through more than a single flexible member such as shown in FIG. 5. In FIG. 5, a first flexible member 160 is mounted to first and second members 128 and 138 through first openings 132 and 144 and a second flexible member 162 is mounted to first and second members 128 and 138 through second openings 133 and 143.

At this point, it should be understood that the flexible members, in accordance with various aspect of the exemplary embodiments, may be formed from an elastomeric material, a non-elastomeric material or a composite material including both elastomeric and non-elastomeric components. Thus, the flexible members may be formed from one or more materials having various degrees of flexibility. Further, it should be understood that the flexible members may take the form of a torsion bar (not shown), hydraulic actuators (also not shown) and the like that enable relative movement between the step member and the cargo bed.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A step assembly for a motor vehicle having a passenger compartment including a driver side and a passenger side and a cargo bed having first and second side portions, the step assembly comprising:
    a first member fixedly mounted relative to the cargo bed;
    a step member extending from a first end configured to be mounted at one of the driver side and the passenger side of the passenger compartment to a second end configured to be mounted at a corresponding one of the first and second side portions of the cargo bed, the step member including a second member fixedly mounted at the second end; and
    at least one flexible member linking the first member and the second member, the at least one flexible member defining each of a rotational axis and a translational axis of the step member relative to the cargo bed.

2. The step assembly according to claim 1, wherein the first end is fixedly mounted relative to the one of the driver side and the passenger side.

3. The step assembly according to claim 1, wherein the at least one flexible member extends from a first end section having a first opening to a second end section having a second opening, the first end section being joined to the first member through the first opening and the second end section being joined to the second member through the second opening.

4. The step assembly according to claim 1, wherein the at least one flexible member comprises a first flexible member and a second flexible member.

5. The step assembly according to claim 4, wherein the first flexible member extends from a first end section having a first opening to a second end section having a second opening, the first end section being joined to the first member through the first opening and the second end section being joined to the second member through the second opening.

6. The step assembly according to claim 5, wherein the second flexible member extends from a first end section having a first opening to a second end section having a second opening, the first end section being joined to the first member through the first opening and the second end section being joined to the second member through the second opening.

7. The step assembly according to claim 1, wherein the at least one flexible member comprises a first flexible member section and a second flexible member section abutting and aligned with the first flexible member section.

8. The step assembly according to claim 1, wherein the at least one flexible member comprises a single flexible member.

9. The step assembly according to claim 1, wherein the at least one flexible member includes four openings, the at least one flexible member being joined to the first member through two of the four openings and to the second member through another two of the four openings.

10. A motor vehicle comprising:
a passenger compartment including a driver side and a passenger side;
a cargo bed mounted in mechanical isolation from the passenger compartment, the cargo bed including a forward portion, a rear portion and first and second side portions, the cargo bed including a first member fixedly mounted at one of the first and second side portions;
a step assembly extending from the passenger compartment to the cargo bed, the step assembly including a step member extending from a first end mounted at one of the driver side and the passenger side of the passenger compartment to a second end mounted at a corresponding one of the first and second side portions of the cargo bed, the step member including a second member fixedly mounted at the second end; and
at least one flexible member linking the first member and the second member, the at least one flexible member defining each of a rotational axis and a translational axis of the step member relative to the cargo bed.

11. The motor vehicle according to claim 10, wherein the first end is fixed relative to the one of the driver side and the passenger side.

12. The motor vehicle according to claim 10, wherein the at least one flexible member extends from a first end section having a first opening to a second end section having a second opening, the first end section being joined to the first member through the first opening and the second end section being joined to the second member through the second opening.

13. The motor vehicle according to claim 10, wherein the at least one flexible member comprises a first flexible member and a second flexible member.

14. The motor vehicle according to claim 13, wherein the first flexible member extends from a first end section having a first opening to a second end section having a second opening, the first end section being joined to the first member through the first opening and the second end section being joined to the second member through the second opening.

15. The motor vehicle according to claim 10, wherein the at least one flexible member comprises a single flexible member.

16. The motor vehicle according to claim 15 wherein the single flexible member includes four openings, the single flexible member being joined to the first member through two of the four openings and to the second member through another two of the four openings.

* * * * *